United States Patent [19]

Shirakami

[11] Patent Number: 4,506,289
[45] Date of Patent: Mar. 19, 1985

[54] CHROMA-KEY SIGNAL GENERATOR

[75] Inventor: Toshiaki Shirakami, Kawasaki, Japan

[73] Assignee: Kokusai Denshin Denwa Kabushiki Kaisha, Tokyo, Japan

[21] Appl. No.: 435,293

[22] Filed: Oct. 19, 1982

[30] Foreign Application Priority Data

Oct. 20, 1981 [JP] Japan .................. 56-168264

[51] Int. Cl.³ .............................. A04N 9/535
[52] U.S. Cl. ............................. 358/22; 358/183
[58] Field of Search ............................ 358/22, 183

[56] References Cited
U.S. PATENT DOCUMENTS
4,394,680 7/1983 Watanabe ......................... 358/22

Primary Examiner—Michael A. Masinick
Attorney, Agent, or Firm—Robert E. Burns; Emmanuel J. Lobato; Bruce L. Adams

[57] ABSTRACT

A chroma-key signal generator is provided which may be utilized to effect an electronic insertion of a picture into another picture, by utilizing a color television signal. The generator includes a first color selection/clip circuit which selects any desired hue signal from three primary color signals and clips it at a given level to provide a first key signal, a second color selection/clip circuit which selects a hue signal of a different hue from the first mentioned hue signal, from the three primary color signals, and clips it at a given level to provide a second key signal, and a logical and arithmetic circuit which logically operates on the first and the second key signal to provide an output signal which is utilized as a key signal.

7 Claims, 13 Drawing Figures

CHROMA-KEY SIGNAL GENERATOR

FIELD OF THE INVENTION

The invention relates to a chroma-key signal generator for use in a television system, and more particularly, to such generator which generates a key signal corresponding to an object being viewed and having a narrow chromaticity range and which improves the extraction of chroma-key.

Recently, a chroma-key has been extensively used in a television system to enable a picture synthesis by electrically inserting another picture into a television picture while utilizing the nature of a color television signal. As a typical example of such picture synthesis, a blue chroma-key back panel of high saturation may be disposed rearwardly of a person, and a color television camera used to televise the person against the background defined by the panel. Another color television camera is used to televise a landscape, for example. A blue chroma-key signal is extracted from the output signal of the first mentioned television camera, and is utilized as a key signal which is used to insert a video signal from the second television camera in a region corresponding to the key signal. In the resulting picture, the person appears as if he actually is disposed against the landscape.

DESCRIPTION OF THE PRIOR ART

In a conventional chroma-key signal generator, a key signal corresponding to a specific chromaticity range is derived from three primary color signal outputs such as red, green and blue, which are produced by a color television camera, for example. The signals are processed in a matrix circuit, and signals from the matrix circuit are processed in a subtractor to produce a chroma-key signal. FIG. 1 schematically illustrates a conventional chroma-key signal generator. Specifically, three primary color signals such as red, green and blue which are produced by a color television camera are fed to the generator. Specifically, a red signal $e_R$ is fed to an input terminal 11, a green signal $e_G$ to an input terminal 12 and a blue signal $e_B$ to an input terminal 13. These signals are applied to a color selection circuit 14, which selects an arbitrary hue signal for output. The color selection circuit 14 comprises a matrix circuit 15 which provides a matrix processing of the red, the green and the blue signals, and a subtractor 16 which subtracts one from the other of a pair of signals from the matrix circuit 15, with the difference therebetween being outputted. As shown in FIG. 2, the matrix circuit 15 includes a pair of ganged potentiometers 17, 18 each having three sliding sides which are angularly displaced from each other by 120°, with terminals 17a, 18a connected to the input terminal 11, terminals 17b, 18b connected to the input terminal 12 and terminals 17c, 18c connected to the input terminal 13. Each potentiometer has a slider 17s, 18s, and the sliders are angularly displaced by 180° from each other. The sliders 17s, 18s are connected to the input of the subtractor 16 through lead wires 19, 20. Returning to FIG. 1, the output of the color selection circuit 14 is connected to the input of a clip circuit 22 through a lead wire 21, and the clip circuit 22 clips an output signal from the color selection circuit 14 at a given level, thereby outputting a key signal. The key signal output from the clip circuit 22 is applied to a shaper 24 through a lead wire 23. The shaper 24 shapes the waveform of the key signal from the clip circuit 22, and delivers the key signal on an output terminal 25, with an impedance matching if required.

In the described arrangement, assuming that a color to be selected, or the hue to be extracted from the screen, is blue, in the color selection circuit 14, the slider 17s of the potentiometer 17 is located on the terminal 17c as shown in FIG. 2 so that $ae_B$ is outputted on the lead wire 19 where a represents a hue correction coefficient of the blue signal $e_B$. The slider 18s of the potentiometer 18 is located diametrically opposite to or 180° displaced from the slider 17s, and thus is located midway between the terminals 18a and 18b. This allows an output signal $b(e_R+e_G)$ to be derived on the lead wire 20 where b represents a hue correction coefficient of the sum of the red signal $e_R$ and the green signal $e_G$. The signals thus obtained on the lead wires 19, 20 are processed in the subtractor 16 in a manner indicated by the following equation:

$$\Delta e_B = ae_B - b(e_R + e_G)$$

The signal $\Delta e_B$ produced on the lead wire 21 as an output from the subtractor 16 is applied to the clip circuit 22, which clips the signal at a given level so as to satisfy the requirement $\Delta e_B \geq 0$, and applies the latter as a key signal to the shaper 24 through the lead wire 23. In the shaper 24, the input key signal is stretched, amplified or clipped to shape the waveform, and after an impedance conversion, if necessary, the key signal is delivered on the output terminal 25.

FIG. 3 illustrates vector patterns for the extracted hue of the key signal thus obtained, which is blue in this instance. In FIG. 3, characters R, G and B represent red, green and blue, respectively, with yellow Y, cyan C and magenta M, which represent mixed colors of adjacent colors, being shown intermediate the primary colors. FIG. 3a represents a normal vector pattern including a chromaticity range, indicated by the hatched area, including the origin and extending over an angle of approximately 180°. The vector pattern contains a number of hues, centered about the blue. FIG. 3b illustrates a vector pattern of the key signal which is obtained when the amplitude of the blue signal $e_B$ is increased, with the chromaticity range being narrowed less than 180°. When the clip level of the clip circuit 22 is increased concomittant with the requirement $\Delta e_B > 0$, there results a vector pattern having a chromaticity range as shown in FIG. 3c. Similarly, by simultaneously changing the amplitude of the blue signal $e_B$ and the clip level, there is obtained a key signal having a vector pattern as shown in FIG. 3d.

However, the described chroma-key signal generator of the prior art suffers from a number of drawbacks. It is recognized that a variety of chroma-key effects are achieved by utilizing the chroma-key signal generator. In a typical case, a blue back panel is disposed rearwardly of a person, as a background, and the panel is illuminated from a lamp. A color television camera is used to televise the person, and a blue chroma-key signal is extracted from an output signal of the camera, and a video signal from another color television camera is inserted in a region corresponding to the key camera.

However, it will be seen that the key signal having a vector pattern as illustrated in FIG. 3a contains a number of color components other than the blue and which are of hues close to the blue. Consequently, there is a limitation on the color available to an object being televised. In other words, it is necessary that colors of those hues which are identical with or close to the blue must not be used with the object in order to achieve the chroma-key effect with the blue back panel. Accordingly, there has been a need in the prior art for a chroma-key signal generator having a narrow chromaticity range.

The key signal having a vector pattern as illustrated in FIG. 3b suffers from a degraded signal-to-nose ratio. The key signal having a vector pattern as illustrated in FIG. 3c suffers from the drawback that the color extraction is either difficult or impossible whenever there is a non-uniform illumination of the blue back panel or when a shading of the television camera is utilized. Similarly, the key signal having a vector pattern as illustrated in FIG. 3d suffers from the both drawbacks experienced with the key signals of FIGS. 3b and 3c.

SUMMARY OF THE INVENTION

It is an object of an the invention to avoid the disadvantages of the prior art by providing a chroma-key signal generator which permits the extraction of arbitrary hue as a key signal having a narrow chromaticity range.

It is another object of the invention to generate a key signal corresponding to an object being televised and having a narrow chromaticity range and to improve the extraction of the chroma-key by performing a logical operation on three primary color signals of red, green and blue which may be obtained from a color television camera or which may be obtained from an NTSC signal.

In accordance with the invention, there is provided a chroma-key signal generator comprising a first color selection circuit receiving three primary color signals as inputs and selecting an arbitrary hue signal for an output, a first clip circuit for clipping the hue signal from the first color selection circuit at a given level to output a first key signal, a second color selection circuit receiving the three primary color signals as inputs and selecting and outputting a hue signal which is different from the first mentioned hue signal, a second clip circuit for clipping the hue signal from the second color selection circuit at a given level to output a second key signal, and a logical and arithmetic circuit for receiving the first and the second key signal and for performing a logical and arithmetic operation thereon to output a third key signal.

In a preferred embodiment of the invention, the first and the second color selection circuits as well as the first and the second clip circuits may comprise circuits used in the conventional chroma-key signal generator, while the logical and arithmetic circuit may comprise a logical product circuit. In this manner, there is obtained a key signal having a vector pattern which has a very narrow chromaticity range. Because the individual key signals are merely logically processed in the logical product circuit, a degradation in the signal-to-noise ratio in the chroma-key signal can be avoided.

DESCRIPTION OF PREFERRED EMBODIMENTS

Figure 4:
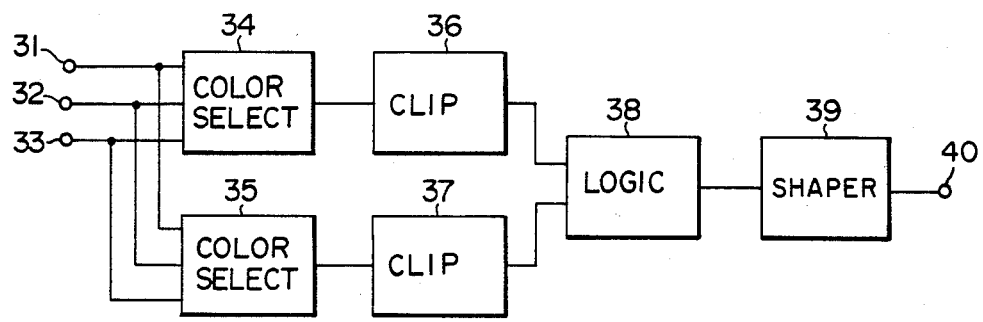
FIG. 4 is a block diagram of a chroma-key signal generator according to one embodiment of the invention.
Figure 3A:
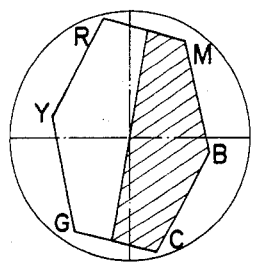
FIGS. 3a to 3d show vector patterns of hues obtained from the conventional chroma-key signal generator.
Figure 3C:
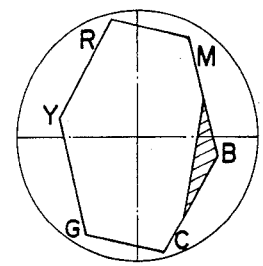
Figure 3B:
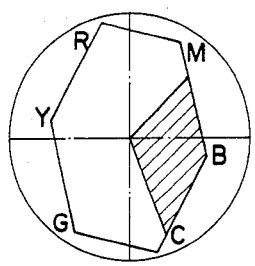
Figure 3D:
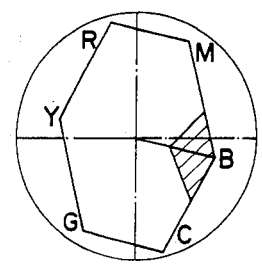

Referring to FIG. 4, a chroma-key signal generator according to one embodiment of the invention will be described. It is to be noted that red, green and blue signals which are produced by a color television camera or the like are applied to input terminals 31, 32 and 33, respectively. These input terminals are individually connected to the respective inputs of a first and a second color selection circuit 34, 35. Each of the first and the second color selection circuits 34, 35 is constructed in a similar manner as the conventional color selection circuit 14 mentioned above, and includes a matrix circuit having a pair of potentiometers and a subtractor. It is also to be understood that each of the color selection circuits 34, 35 operates in the similar manner as the conventional circuit 14. In the first color selection circuit 34, potentiometers (not shown) thereof are adjusted to derive an arbitrary hue signal so that a key signal having a vector pattern as illustrated by a hatched area in FIG. 5a can be outputted. On the other hand, in the second color selection circuit 35, potentiometers (not shown) thereof are adjusted to derive a hue signal which is different from that derived from the first color selection circuit 34 so that another key signal having a vector pattern as illustrated by a hatched area in FIG. 5b can be outputted. The output of the first color selection circuit 34 is connected to the input of a first clip circuit 36 while the output of the second color selection circuit 35 is connected to the input of a second clip circuit 37. The first and the second clip circuits 36, 37 each operate to clip the key signal fed from the first or the second color selection circuit at a given level to output a first or a second key signal. Such processing of signals can be achieved by utilizing the conventional clip circuit 22 mentioned above. The first and the second key signals are applied to a logical and arithmetic circuit 38, which may comprise a logical circuit such as a logical product circuit, a logical sum circuit, an exclusive logical sum circuit or an inhibit circuit. An output signal from the circuit 38 is applied to a shaper 39, which shapes the waveform as by stretching, amplifying or clipping, and provides a desired impedance conversion if required, to output a key signal at an output terminal 40. The shaper may also comprise a conventional circuit.

Figure 5A:
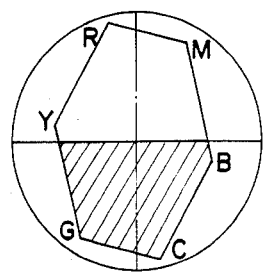
FIGS. 5a to 5e illustrate vector patterns of hues obtained from the generator of the invention.
Figure 5B:
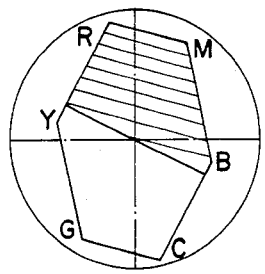
Figure 5C:
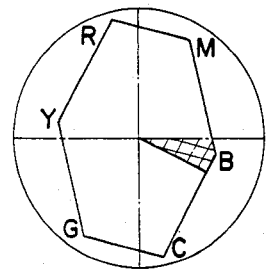
Figure 5D:
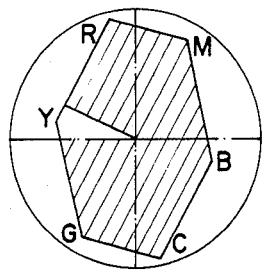

It may be assumed that the logical and arithmetic circuit 38 is formed by a logical product circuit. In this instance, the first key signal which is outputted from the first clip circuit 36 and having a vector pattern as illustrated in FIG. 5a and the second key signal which is outputted from the second clip circuit 37 and having a vector pattern as illustrated in FIG. 5b are applied to the logical product circuit, and a key signal is outputted to the shaper 39 which has a vector pattern as illustrated by a cross-hatched area in FIG. 5c. In other words, the logical product circuit 38 operates to output a key signal having a chromaticity range which is defined by the superimposition of the chromaticity range extracted by the first color selection circuit 34 and the chromaticity range extracted by the second color selection circuit 35. In this manner, a key signal having a vector pattern which has a very narrow chromaticity range as illustrated in FIG. 5c can be derived by a suitable choice of the ranges of extraction preset by the first and the second color selection circuits 34, 35, respectively. It is also to be noted that the key signals from the circuits 34, 35 are merely logically combined in the circuit 38, avoiding any degradation in the signal-to-noise ratio. In this manner, there is obtained a key signal having a very narrow range which has been considered to be very difficult to achieve with the prior art.

Where the logical and arithmetic circuit 38 is formed by a logical sum circuit, it outputs a key signal having a vector pattern as illustrated by a hatched area in FIG. 5d or a logical sum of vector patterns shown in FIGS. 5a and 5b. The shaper 39 shapes the waveform of the key signal before it is outputted to the terminal 40. Where the circuit 38 comprises a logical sum circuit, the vector pattern of the key signal is adapted to extract hues over an angular range greater than 180° and including the origin. In this manner, it is possible to extract every hue except a specified hue and a closely related range, thus extending the applicability of the chroma-key effect.

If the circuit 38 is formed by an exclusive logical sum circuit, the resulting vector pattern will be defined by an exclusive logical sum of the vector patterns shown in FIGS. 5a and 5b, or a vector pattern having a range of hues which are found in one of the patterns but not found in the other, namely, the vector pattern of FIG. 5d from which the vector pattern of FIG. 5c is subtracted.

If the circuit 38 is formed by an inhibit circuit or a similar logical circuit, it outputs an inhibit signal whenever a hue signal to be extracted has a color purity greater than a given value, thus preventing the hue signal from being outputted. Thus, the key signal outputted by the circuit 38 has a vector pattern of hue signals which have a color purity less than a given value.

Where the circuit 38 is formed by a logical circuit having an inhibit function, an inhibit signal is again outputted whenever a hue signal has a color purity greater than a given value, thus inhibiting a signal output from the circuit. In this manner, a key signal having a color purity within a given value may be obtained.

This prevents the chroma-key effect from being influenced by a hue signal having a greater color purity, and allows only a color signal of a color purity which is less than a given value to be used, thereby allowing the implementation of a "soft" chroma-key effect.

It will be appreciated from the foregoing that a variety of vector patterns can be obtained by utilizing various logical circuits for the logical and arithmetic circuit 38 thus facilitating the applicability of the chroma-key effect. It should be understood that the invention is not limited to the specific forms of logical circuits mentioned above, but that a variety of logical circuits can be used without departing from the scope of the invention.

Figure 5E:
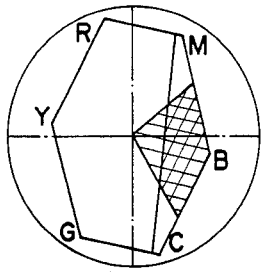

The vector pattern of the key signal obtained can also be changed by varying the amplitude of the input signals to the first and the second color selection circuits 34, 35 or varying the clip level of the first and the second clip circuits 36, 37. FIG. 5e shows a vector pattern which exemplifies this. Specifically, the amplitude of the input signal is adjusted in the first color selection circuit 34 while the clip level of the second clip circuit 37 is changed. If the logical and arithmetic circuit 38 is formed by a logical product circuit, the resulting key signal has a vector pattern as illustrated by a hatched area in FIG. 5e. If a logical sum circuit is utilized, the resulting key signal obtains a vector pattern as illustrated by a cross-hatched area in FIG. 5e.

Figure 1:
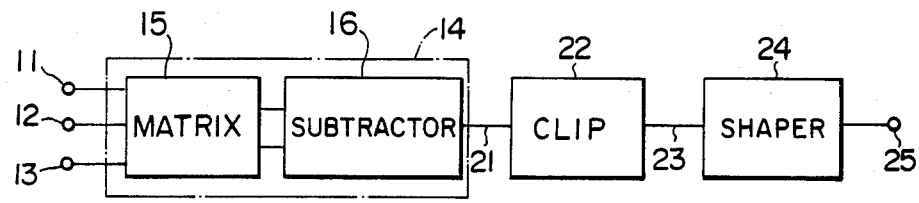
FIG. 1 is a block diagram illustrating one form of conventional chroma-key signal generator.
Figure 2:
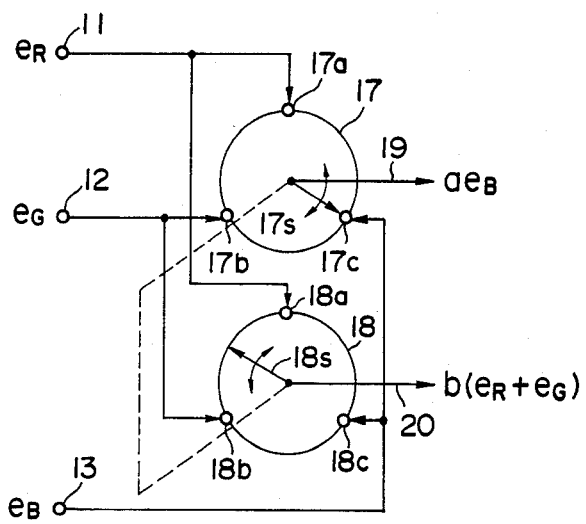
FIG. 2 is a schematic view of a matrix circuit which may be used in the arrangement of FIG. 1.
Figure 6:
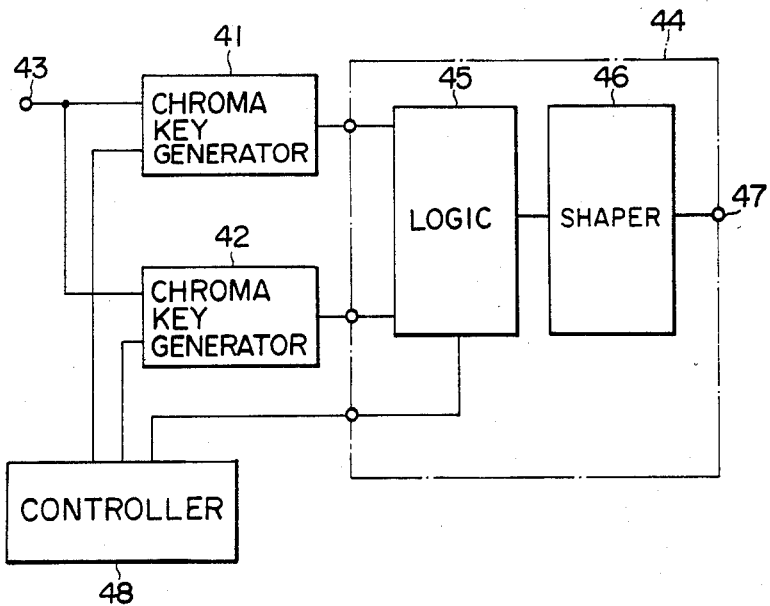
FIG. 6 is a block diagram of a chroma-key signal generator according to another embodiment of the invention in which a NTSC signal is used.

FIG. 6 illustrates an embodiment of the invention as implemented in a conventional chroma-key signal generator of NTSC type. In a conventional chroma-key signal generator of NTSC type, a decoder is used to derive three primary color signals from an NTSC signal fed from a color television camera, and the primary color signals are processed by a color selection circuit and a clip circuit to output a key signal. The arrangement and the operation of the color selection circuit and the clip circuit are similar to those of the conventional color selection circuit and clip circuit mentioned above in connection with FIG. 1. When the invention is applied to such chroma-key signal generator, it is necessary that a pair of chroma-key signal generators 41, 42 be provided, with both generators producing key signals having different hues. It is to be understood that each of the generators 41, 42 includes a decoder, a color selection circuit and a clip circuit, and the adjustment of the hue is performed by an adjustment of a potentiometer contained in the color selection circuit of the second generator 42. In response to an NTSC signal applied to an input terminal 43, the first and the second generators 41, 42 output key signals having different hues, both of which are applied to a chroma-key signal generator 44 constructed in accordance with the invention. As in the embodiment shown in FIG. 4, the generator 44 includes a logical and arithmetic circuit 45, and a shaper 46 having its input connected to the output of the circuit 45. Consequently, the chroma-key signals from the first and the second generator 41, 42 are logically processed within the circuit 45, shaped in waveform by the shaper 46, whereby a key signal can be obtained at an output terminal 47 which may have various configurations as mentioned previously. A controller 48 is provided to control the croma-key signal generators 41, 42 and the logical and arithmetic circuit 45.

It will be appreciated from the foregoing that a variety of chroma-key effects can be achieved by logically processing a pair of key signals in accordance with the invention. Furthermore, it should be noted that the processing of an increased number of key signals can produce a key signal having a vector pattern which represents a complex hue pattern. By way of example, three sets of color selection circuits and clip circuits (not shown) may be provided for producing a first, a second and a third key signal. The first and the second key signals may be processed in a first logical circuit to provide a fourth key signal. The third and the fourth key signals may then be processed in a second logical circuit to product a fifth key signal. In the operation of the chroma-key signal generator, either one of the first to the third key signal may be utilized as a chroma-key signal, or the fourth or the fifth key signal may be utilized. In this manner, the applicability of the chroma-key is extended, and a free choice of a key signal having a restricted color range or a special key signal is allowed.

What is claimed is:

1. A chroma-key signal generator comprising: a first color selection circuit for receiving three primary color signals as inputs and operative to select as an output any desired hue signal, a first clip circuit for clipping the hue signal from the first color selection circuit at a given level to produce a first key signal, a second color selection circuit for receiving the aforesaid three primary color signals as inputs and operative to select as an output a hue signal which is different from the hue signal from the first color selection circuit, a second clip circuit for clipping the hue signal from the second color selection circuit at a given level to produce a second key signal, and a logical and arithmetic circuit for receiving the first and the second key signals and performing a logical and arithmetic operation thereon to produce a third key signal.

2. A chroma-key signal generator according to claim 1 in which the logical and arithmetic circuit comprises a logical product circuit.

3. A chroma-key signal generator according to claim 1 in which the logical and arithmetic circuit comprises a logical sum circuit.

4. A chroma-key signal generator according to claim 1 in which the logical and arithmetic circuit comprises an exclusive logical sum circuit.

5. A chroma-key signal generator according to claim 1 in which the logical and arithmetic circuit comprises an inhibit circuit.

6. A chroma-key signal generator according to claim 1 in which the first color selection circuit includes means for adjusting the amplitude of the three primary color signals while the second clip circuit includes means for clipping the output signal from the second color selection circuit at a variable clip level.

7. A chroma-key signal generator according to claim 1 in which the logical and arithmetic circuit comprises a logical circuit having an inhibit function.

* * * * *

UNITED STATES PATENT AND TRADEMARK OFFICE
CERTIFICATE OF CORRECTION

PATENT NO. : 4,506,289
DATED : March 19, 1985
INVENTOR(S) : Toshiaki Shirakami

It is certified that error appears in the above-identified patent and that said Letters Patent is hereby corrected as shown below:

On the title page item (73) should read --Assignee:
The General Corporation, Kanagawa, Japan Signed and Sealed this Sixteenth Day of July 1985

[SEAL]

Attest:

DONALD J. QUIGG

Attesting Officer        Acting Commissioner of Patents and Trademarks